United States Patent [19]

Fujii et al.

[11] 4,266,043

[45] May 5, 1981

[54] RESILIENT HYDROPHOBIC FOAMED POLYMER

[75] Inventors: Osamu Fujii, Konosu; Toshio Kishimoto, Saitama; Akio Kobayashi, Higashi Matsuyama, all of Japan

[73] Assignee: Toyo Rubber Chemical Industrial Corporation, Tokyo, Japan

[21] Appl. No.: 90,892

[22] Filed: Nov. 5, 1979

Related U.S. Application Data

[63] Continuation-in-part of Ser. No. 793,598, May 4, 1977, abandoned, which is a continuation-in-part of Ser. No. 603,711, Aug. 11, 1975, abandoned.

[30] Foreign Application Priority Data

Aug. 15, 1974 [JP] Japan ............................ 49-93670

[51] Int. Cl.$^3$ .................. C08G 18/14; C08G 18/12; C08G 18/48
[52] U.S. Cl. ....................... 521/175; 521/174; 521/122; 521/905; 521/914
[58] Field of Search ............. 521/174, 175, 905, 914, 521/100, 102, 122

[56] References Cited

U.S. PATENT DOCUMENTS

| | | | |
|---|---|---|---|
| 2,726,219 | 12/1955 | Hill, Jr. ........................ | 260/2.5 AP |
| 2,977,330 | 3/1961 | Brower ......................... | 260/2.5 AD |
| 3,042,631 | 7/1962 | Strandskov ................... | 260/2.5 AD |
| 3,661,860 | 5/1972 | Schwarz ....................... | 260/2.5 AD |
| 3,793,241 | 2/1974 | Kyle et al. .................... | 260/2.5 AD |
| 3,812,618 | 5/1974 | Wood et al. ................... | 260/2.5 AP |
| 3,812,619 | 5/1974 | Wood et al. ................... | 260/2.5 AT |
| 3,903,232 | 9/1975 | Wood et al. ................... | 260/2.5 AP |
| 3,959,191 | 5/1976 | Kehr et al. .................... | 260/2.5 AG |
| 4,057,519 | 11/1977 | Summers et al. .............. | 521/122 |
| 4,142,030 | 2/1979 | Dieterich et al. .............. | 521/122 |

OTHER PUBLICATIONS

Saunders et al., Polyurethanes, Part I, pp. 219-228; Part II, pp. 43, 44, 99-103, 173, Interscience (N.Y.) 1962 and 1964.

*Primary Examiner*—H. S. Cockeram
*Attorney, Agent, or Firm*—Carroll F. Palmer

[57] ABSTRACT

A resilient hydrophobic foamed polymer obtained by reacting a mixture of an isocyanate terminated urethane prepolymer and a polyisocyanate (A) with aqueous material, said prepolymer being relatively hydrophilic and the reaction product of a molar excess of a polyisocyanate (B) with a polyetherpolyol having from 15 to 50% by weight of oxethylene content, said aqueous material having a water content between about 15 to 150% by weight based on said prepolymer, the amount of said polyisocyanate (A) ranging between about 5 to 15% by weight based on said prepolymer, said polyetherpolyol being selected from the group consisting of (a) the addition polymerization product of a starting material, ethylene oxide and another epoxide and (b) a mixture of at least two of the following:

(1) The addition polymerization product of a starting material and ethylene oxide;
(2) the addition polymerization product of a starting material and an epoxide other than ethylene oxide;
(3) the addition polymerization material, ethylene oxide and another epoxide, and said starting material being selected from the group consisting of ethylene glycol, diethylene glycol, propylene glycol; dipropylene glycol; butylene glycol; hexylene glycol; glycerol; trimethylolethane; trimethylol propane; 1,2,6-hexanetriol; pentaerythritol; α-methylglycoside; sorbitol and sucrose.

9 Claims, No Drawings

RESILIENT HYDROPHOBIC FOAMED POLYMER

CROSS-REFERENCE TO RELATED APPLICATION

This application is a continuation-in-part application of the U.S. patent application Ser. No. 793,598 filed May 4, 1977 which in turn is a continuation-in-part application of U.S. patent application Ser. No. 603,711 filed Aug. 11, 1975 both now abandoned.

BACKGROUND OF THE INVENTION

This invention relates to a novel resilient hydrophobic foamed polymer and a method of producing the same, particularly, to a polymer high in expansion degree, tensile strength and hardness and low in specific gravity and a method of producing the same. The polymer of this invention is suitable for use as a cushioning material.

In general a polyurethane foam is produced by a prepolymer method or one-shot method. In the prepolymer method, isocyanate terminated urethane prepolymer is prepared first by the reaction between polyetherpolyol and a molar excess of polyisocyanate, followed by reacting the prepolymer with water in the presence of, generally, an amine catalyst so as to obtain the product of polyurethane foam.

U.S. Pat. Nos. 3,812,618; 3,812,619 and 3,903,232 disclose a method of producing a polyurethane foam without using an amine catalyst. In these U.S. patents, a hydrophilic urethane prepolymer is formed first by the reaction between polyisocyanate and polyetherpolyol containing 60 to 100 mol % of oxyethylene, followed by reacting the prepolymer with a large amount of water so as to obtain the product of polyurethane foam.

Since the urethane prepolymers described in said U.S. patents present a solid form or an extremely viscous liquid form at lower temperatures than about 40° C., considerable difficulties are encountered in uniformly mixing a large amount of water with such form of prepolymer. Therefore, manufacture of a foamed product from the above-mentioned prepolymer requires temperature control to maintain the prepolymer in the form of slightly viscous liquid, unavoidably resulting in high production cost. Furthermore, the resilient foamed polymers of said U.S. patent have the drawbacks that they have a relatively low degree of expansion on foaming, they have a dimensional shrinkage with time of about 15%, and are extremely hygroscopic. Consequently, they are considered unacceptable for use as cushioning materials, such as mattresses or automobile seats, or for use as heat-insulating materials.

Further, a method of producing a hydrophobic polyurethane foam, which comprises reacting polyisocyanate with hydrophobic polyetherpolyol such as polypropylene glycol so as to prepare a hydrophobic urethane prepolymer and reacting the prepolymer with water, is disclosed in, for example, U.S. Pat. No. 3,661,860. In this case, however, it is necessary to use an emulsifying agent for carrying out the reaction between the hydrophobic urethane prepolymer and water because a prepolymer of this type is incompatible with water.

Another method of producing a polyurethane foam is disclosed in U.S. Pat. No. 3,042,631. In this case, a prepolymer is formed first by the reaction among diisocyanate, polyetherpolyol containing 5 to 95 mol % of oxyethylene and polyether diamine containing 5 to 95 mol % of oxyethylene, followed by reacting the prepolymer with about 0.5 to 10% by weight of water so as to obtain the product of polyurethane foam. It should be noted that the oxyethylene content of the polyetherpolyol ranges as wide as between 5 and 95%. This suggests that the resultant prepolymer and polyurethane foam may be either hydrophobic or hydrophilic depending on the actual oxyethylene content of the polyetherpolyol. It should also be noted that a polyether diamine is used as a crosslinking agent or catalyst, resulting in that the product foam retains with an amine odor. An additional difficulty to be noted is that foaming cannot be carried out effectively and, thus, the cell size of the product foam becomes nonuniform because a small amount of water is reacted with the prepolymer.

A polyurethane foam for use as particularly a cushioning material should have a high hardness and a low specific gravity. It has been impossible, however, to produce a hydrophobic polyurethane foam meeting these properties.

SUMMARY OF THE INVENTION

An object of this invention is to provide a novel resilient hydrophobic foamed polymer high in expansion coefficient, tensile strength and hardness and low in specific gravity and, thus, suitable for use as a cushioning material.

Another object is to provide a method of easily producing the novel resilient hydrophobic foamed polymer of the particular properties.

According to this invention, there is provided a resilient hydrophobic foamed polymer obtained by reacting a mixture of an isocyanate terminated urethane prepolymer and a polyisocyanate (A) with aqueous material, said prepolymer being relatively hydrophilic and the reaction product of a molar excess of a polyisocyanate (B) with a polyetherpolyol having from 15 to 50% by weight of oxyethylene content, said aqueous material having a water content between about 15 to 150% by weight based on said prepolymer, the amount of said polyisocyanate (A) ranging between about 5 to 15% by weight based on said prepolymer, said polyetherpolyol being selected from the group consisting of (a) the addition polymerization product of a starting material, ethylene oxide and another epoxide and (b) a mixture of at least two of the following:

(1) the addition polymerization product of a starting material the ethylene oxide;

(2) the addition polymerization product of a starting material and an epoxide other than ethylene oxide;

(3) the addition polymerization material, ethylene oxide and another epoxide, and said starting material being selected from the group consisting of ethylene glycol, diethylene glycol, propylene glycol; dipropylene glycol; butylene glycol; hexylene glycol; glycerol; trimethyolethane; trimethyol propane; 1, 2, 6-hexanetriol; pentaerythritol; α-methylglycoside; sorbitol and sucrose.

DETAILED DESCRIPTION OF THE PREFERRED EMBODIMENT

This invention is based on the finding that a relatively hydrophilic urethane prepolymer can be obtained by reacting a polyetherpolyol containing 15 to 50% by weight of oxyethylene relative to the prepolymer amount with a molar excess of a polyisocyanate. Naturally, the prepolymer can be reacted with such a large amount as 15 to 150% by weight of water so as to produce a hydrophobic polyurethane foam having a high degree of expansion. It has also been found that a polyurethane foam having a high hardness and a low specific gravity and, thus, suitable for use as a cushioning material can be produced by reacting with water a mixture of the prepolymer and 5 to 15% by weight of a polyisocyanate based on the prepolymer amount.

The relatively hydrophilic urethane prepolymer can be prepared by reacting a polyetherpolyol containing 15 to 50% by weight, preferably, 30 to 45% by weight of oxyethylene relative to the prepolymer amount with a molar excess of a polyisocyanate at 60° to 100° C. for 2 to 5 hours with the reactants kept stirred.

Suitable polyisocyanates include, for example, tolylene diisocyanate, naphthalene diisocyanate, diphenylmethane diisocyanate, xylylene diisocyanate and hexamethylene diisocyanate.

Suitable polyether polyols include, for example, the addition polymerisation reaction products of compounds containing a plurality of active hydrogen atoms, for example, ethylene glycol, diethylene glycol, propylene glycol, dipropylene glycol, butylene glycol, hexylene glycol, glycerol, trimethylol ethane, trimethylol propane, 1,2,6-hexanetriol, pentaerythritol, $\alpha$-methyl glucoside, sorbitol or sucrose, and ethylene oxide, and optionally any other epoxide, for example, propylene oxide, butylene oxide or styrene oxide, provided such reaction products contain from 15 to 50% preferably from 30 to 45% by weight of oxyethylene content. Alternatively, the polyetherpolyol may be a mixture of two or more of the following:

(1) the addition polymerisation reaction product of a compound containing a plurality of active hydrogen atoms and ethylene oxide;

(2) the addition polymerisation reaction product of a compound containing a plurality of active hydrogen atoms and any epoxide other than ethylene oxide;

(3) the addition polymerisation reaction product of a compound containing a plurality of active hydrogen atoms, ethylene oxide and any epoxide other than ethylene oxide.

A preferred example of the latter type of polyetherpolyol is a mixture of the addition polymerisation reaction product of glycerol, ethylene oxide and propylene oxide and the addition polymerixation reaction product of glycerol and propylene oxide. The molecular weight of the polyetherpolyol may be varied over a broad range by varying the proportion of the epoxide(s) used.

If the oxyethylene content of the polyether polyol is over 50% by weight, the resultant urethane prepolymer becomes extremely hydrophilic and thus very reactive with water. But the resultant foamed polymer becomes also hydrophilic. This does not meet the object of this invention. If the oxyethylene content is less than 15% by weight, the resultant urethane prepolymer becomes hydrophobic and poorly reactive with water, and foamed polymer can hardly be formed. This does not meet the object of this invention, either. For this reason, this invention uses polyether polyol containing 15 to 50% by weight of oxyethylene to prepare a relatively hydrophilic urethane prepolymer.

It should also be noted that the oxyethylene content ranging between 15 and 50% by weight permits the foamed polymer to have a very small compression permanent strain, compared with the content falling outside the range mentioned. If a foamed polymer of a predetermined thickness has been compressed, the polymer is caused to bear a residual strain after removal of the compression force. The compression permanent strain is the residual strain mentioned above. Naturally, a foamed polymer used as a cushioning material should have a compression permanent strain as small as possible.

The term "relatively hydrophilic prepolymer" used herein denotes that the prepolymer is capable of reaction with 15 to 150% by weight of water in the absence of an emulsifying agent or catalyst so as to produce a hydrophobic foamed polymer.

The urethane prepolymer is mixed with 5 to 15% by weight of a polyisocyanate based on the prepolymer amount, followed by reacting the mixture with an aqueous material containing 15 to 150% by weight, preferably, 20 to 100% by weight of water based on the prepolymer amount so as to obtain the product of a hydrophobic foamed polymer. The aqueous materials used in this invention include water, aqueous emulsion, aqueous dispersion, and aqueous solution. Any of polyisocyanates used for preparing the prepolymer can be used as the polyisocyanate mixed with the prepolymer. The polyisocyanate is mixed with the prepolymer in order to increase the hardness and decrease the specific gravity of the product foamed polymer. In other words, a mixture of the prepolymer and polyisocyanate is reacted with water so as to produce a foamed polymer having a high hardness and a low specific gravity and, thus, suitable for use as a cushioning material. The above-noted effect cannot be produced if the amount of the polyisocyanate mixed with the prepolymer is less than 5% by weight. If the amount mentioned is larger than 15% by weight, the foamed polymer fails to exhibit a sufficient repulsive force, namely, the foam is completely compressed when depressed, failing to provide a satisfactory cushioning material, though the specific gravity of the foam can be lowered.

The reason for the increased hardness and decreased specific gravity of the foamed polymer mentioned above is supposed to be as follows. Where a mixture of the prepolymer and polyisocyanate is reacted with an aqueous material, the number of isocyanate radicals—NCO is very large, leading to a large amount of $CO_2$ formed by the reaction between—NCO and water. It follows that the expansion degree of the foam is enhanced, resulting in a decreased specific gravity of the foam. Likewise, a large number of urea bonds are formed by the reaction between—NCO and water, leading to a high crosslinking density and, thus, to an increased hardness of the foam.

As mentioned previously, the water content of the aqueous material reacted with a mixture of the prepolymer and polyisocyanate should range between 15 and 150% by weight, preferably, between 20 and 100% by weight based on the amount of prepolymer. If the water content mentioned is less than 15% by weight, the prepolymer and polyisocyanate fail to be dispersed uniformly in the aqueous material. This gives rise to the presence of unreacted materials. In addition, foaming can not be carried out sufficiently, leading to a resinous lump-like product or foamed polymer containing small cells. On the other hand, the water content exceeding 150% by weight gives rise to free water.

The reaction among the prepolymer, polyisocyanate and aqueous material is thought to proceed in accordance with the following reaction schemes $$-NCO + H_2O \rightarrow -NH_2 + CO_2 \quad (1)$$

The carbon dioxide from this step contributes to the foaming of the polymer.

The amine compounds react with part of the unreacted urethane prepolymer to form urea $$-NH_2 + -NCO_2 \rightarrow (NH_2)_2CO \quad (2)$$

The urea and remaining unreacted urethane prepolymer react with each other to provide a biuret cross-linked structure (—NHCO—NH—CONH—), which in turn forms the basis of a three-dimensional net-like structure found in the resilient foamed polymers according to the invention.

$$(NH_2)CO + -NCO \rightarrow -NHCO-NH-CONH- \quad (3)$$

Compared to that of the prior art process in which a catalyst is used, the heat of reaction is low and it is found to be unnecessary to cool the metal die in which the foamed polymer is moulded. Furthermore, the resilient foamed polymers can be prepared simply by adding the prescribed amount of water to the urethane prepolymer and polyisocyanate with stirring, without the need for complicated equipment, and since the polymer is moulded with only a relatively low foaming pressure, it is possible to use an inexpensive plastics or wooden mould, as well as the more conventional metal mould.

Described in the following are Examples of this invention.

EXAMPLES 1 to 4 AND CONTROLS 1 to 4

Tri-functional polyetherpolyols differing from each other in oxyethylene content were prepared by additional polymerization reactions among glycerin, propylene oxide and varied amounts of ethylene oxide. Specifically, the oxyethylene content of each of the polyetherpolyols thus prepared was 0% (Control 1), 10% (Control 2), 15% (Example 1), 30% (Example 2), 45% (Example 3), 50% (Example 4), 60% (Control 3) and 80% (Control 4) based on the weight of the polyetherpolyol.

Then, 35 parts by weight of tolylene diisocyanate (a mixture of 2,4-isomer and 2,6-isomer in the ratio of 80:20) was added to 100 parts by weight of the polyetherpolyol. The mixture was stirred for 3 hours at 90° C. so as to prepare a urethane prepolymer by the reaction between the two. Table 1 shows the viscosity of the prepolymer measured at 20° C.

TABLE 1

|  | Control 1 | Control 2 | Example 1 | Example 2 | Example 3 | Example 4 | Control 3 | Control 4 |
|---|---|---|---|---|---|---|---|---|
| oxyethylene content (%) | 0 | 10 | 15 | 30 | 45 | 50 | 60 | 80 |
| viscosity (cps) | 1600 | 1800 | 1800 | 2000 | 2400 | 2800 | 12,000 | Solidified |

The above table shows that the viscosity of the prepolymer rapidly increases if the oxyethylene content of the polyetherpolyol is not less than about 50 wt % and that the prepolymer begins to be solidified if the oxyethylene content exceeds about 60 wt%.

Tolylene diisocyanate (isomer ratio 80:20) in an amount of 10% based on the weight of the prepolymer was mixed with each of the prepolymers except the prepolymer of Control 4 which had been solidified, followed by reacting to mixture at room temperature with water in an amount of 20% based on the weight of the prepolymer. Foaming was not recognized in Control 1, but foamed polymers were obtained from the other six samples.

Table 2 shows the degree of expansion, i.e., the ratio of the volume of the foamed polymer to the volume before foaming, of each of the foamed polymers.

TABLE 2

|  | Control 2 | Example 1 | Example 2 | Example 3 | Example 4 | Control 3 |
|---|---|---|---|---|---|---|
| oxyethylene content (%) | 10 | 15 | 30 | 45 | 50 | 60 |
| degree of expansion | 6.0 | 26 | 34 | 36 | 34 | 22 |

Table 2 shows that the degree of expansion is low if the oxyethylene content of the polyetherpolyol is less than 15% by weight. Naturally, a foamed polymer low in expansion degree is unsuitable for use as, for example, a cushioning material. Incidentally, the foam of Control 2 was nonuniform in cell size and large cells were recognized in some portions of the foam.

The foamed polymers were tested for the hydrophobic nature. Specifically, three samples of 5 cm cube were cut from each foam, totalling 18 samples. These samples were put in a bath maintained at 40° C. and 90 to 98% of humidity and taken out of the bath 8 hours later. Table 3 shows the weight of the sample taken out of the bath. The value shown in the table represents the index with the weight of the sample before the test set at 100.

TABLE 3

|  |  | Control 2 | Example 1 | Example 2 | Example 3 | Example 4 | Control 3 |
|---|---|---|---|---|---|---|---|
| Weight of sample | 1 | 102 | 103 | 107 | 108 | 110 | 150 |
|  | 2 | 102 | 102 | 105 | 108 | 112 | 142 |
|  | 3 | 101 | 103 | 105 | 107 | 109 | 139 |

Table 3 shows that the oxyethylene content of the polyetherpolyol exceeding 50% causes the foamed polymer to absorb a large amount of water. In contrast, the oxyethylene content not exceeding 50% enables the foamed polymer to exhibit a hydrophobic nature.

Additional three samples of 5 cm cube were prepared from each foam for a compression strain test. Specifically, each sample was compressed into a thickness of 2.5 cm and maintained as it was for 22 hours at 70° C. 30 minutes after removal of the compression force, the thickness of the sample was measured for determining the compression permanent strain S of the sample by the following formula:

$$S = (t_0 - t_1)/t_0 \times 100$$

where, $t_0$ is the original thickness of the sample (5 cm) and $t_1$ is the thickness of the sample after removal of the compression force.

Table 4 shows the results.

TABLE 4

|  | | Control 2 | Example 1 | Example 2 | Example 3 | Example 4 | Control 3 |
|---|---|---|---|---|---|---|---|
| Compression permanent strain (%) | 1 | 27 | 4.5 | 4.0 | 4.0 | 4.5 | 9 |
|  | 2 | 21 | 5.0 | 4.5 | 4.0 | 4.0 | 16 |
|  | 3 | 25 | 5.5 | 4.0 | 4.5 | 4.5 | 12 |

Table 4 shows that the foamed polymer of this invention has a very small compression permanent strain and, thus, is very suitable for use as a cushioning material.

Additional 18 samples were prepared from the foamed polymers and the tensile strength (Kg/cm$^2$) of each sample was measured in accordance with JIS K 6401, with the results as presented in Table 5. A tensile strength is an important property of the cushioning material.

TABLE 5

|  | | Control 2 | Example 1 | Example 2 | Example 3 | Example 4 | Control 3 |
|---|---|---|---|---|---|---|---|
| Tensile strength (kg/cm$^2$) | 1 | 0.3 | 1.0 | 1.0 | 1.1 | 1.0 | 0.7 |
|  | 2 | 0.4 | 1.0 | 0.9 | 1.0 | 1.1 | 0.5 |
|  | 3 | 0.3 | 0.9 | 1.1 | 1.1 | 1.1 | 0.5 |

Table 5 shows that the oxyethylene content of the polyetherpolyol exceeding 50% causes the foamed polymer to be low in tensile strength and, thus, unsuitable for use as a cushioning material.

EXAMPLES 5 to 9 AND CONTROLS 5 to 7

Addition polymerization was carried out among ethylene glycol, ethylene oxide and butylene oxide so as to prepare a polyetherpolyol containing 40% by weight of oxyethylene and having a molecular weight of 3,000. Then, 35 parts by weight of tolylene diisocyanate was added to 100 parts by weight of the polyetherpolyol and the mixture was stirred for 3 hours at 90° C. so as to prepare urethane prepolymer by the reaction between the two. Further, 10% by weight of tolylene diisocyanate was mixed with the prepolymer and the mixture was allowed to react with varied amounts of water of room temperature. Specifically, the amount of water was 5% (Control 5), 7% (Control 6), 15% (Example 5), 20% (Example 6), 50% (Example 7), 100% (Example 8), 150% (Example 9) and 200% (Control 7) based on the weight of the prepolymer.

A resinous lump was obtained in Control 5 where the amount of water was 5% by weight. But, foamed polymers were obtained in the other cases, though foaming was recognized only slightly in Control 6 where the amount of water was 7% by weight. Table 6 shows the degree of expansion and condition of foam of the foamed polymers.

TABLE 6

|  | Control 6 | Example 5 | Example 6 | Example 7 | Example 8 | Example 9 | Control 7 |
|---|---|---|---|---|---|---|---|
| Water addition (wt %) | 7 | 15 | 20 | 50 | 100 | 150 | 200 |
| Degree of expansion | small | 29 | 35 | 29 | 24 | 18 | 15 |
| Condition of foam | insufficient in cell | uniform cell | uniform cell | uniform cell | uniform cell | uniform cell | presence of free water |
| size |  |  |  |  |  |  |  |

Table 6 shows that it is impossible to produce a satisfactory foamed polymer where the amount of water does not fall within the range of between 15 and 150% by weight based on the prepolymer. Specifically, foaming is very difficult to occur if the amount of water is less than 15% by weight. On the other hand, more than 150% by weight of water gives rise to the presence of free water. It is also seen from Table 6 that the amount of water ranging between 20 and 100% by weight permits producing a foamed polymer having a particularly high expansion degree.

EXAMPLES 10 to 13 AND CONTROLS 8 to 10

A polyetherpolyol having a molecular weight of 3,000 and containing 80% by weight of oxyethylene, which had been prepared by the addition polymerization among glycerin, ethylene oxide and propylene oxide, was mixed with another polyetherpolyol prepared by the addition polymerization between glycerin and propylene oxide, exyethylene content of said polyetherpolyol being 100% by weight, so as to obtain a polyetherpolyol containing 45% by weight of oxyethylene. Then, 33 parts by weight of tolylene diisocyanate was mixed with 100 parts by weight of the polyetherpolyol and the mixture was kept stirred for 2 hours at 85° C., thereby obtaining urethane prepolymer containing 9.5% of NCO. Further, a small amount of silicone oil, 20% by weight of water based on the prepolymer and varied amounts of 4,4'-diphenylmethane diisocyanate were mixed with 100 parts by weight of the prepolymer and reaction was carried out so as to produce foamed polymers. The amount of 4,4-diphenylmethane diisocyanate was 0% (Control 8), 3% (Control 9), 5% (Example 10), 7% (Example 11), 10% (Example 12), 15% (Example 13) and 20% (Control 10) based on the weight of the prepolymer.

Table 7 shows the hardness, determined by JIS K 6401, and specific gravity of the foamed polymers.

TABLE 7

|  | Control 8 | Control 9 | Example 10 | Example 11 | Example 12 | Example 13 | Control 10 |
|---|---|---|---|---|---|---|---|
| Polyissocianate addition (wt %) | 0 | 3 | 5 | 7 | 10 | 15 | 20 |
| Hardness (kg/314 cm$^2$) | 10.5 | 11.0 | 12.5 | 14.0 | 14.5 | 14.5 | 12.0 |
| Specific gravity | 0.037 | 0.035 | 0.033 | 0.030 | 0.030 | 0.028 | 0.028 |

Table 7 shows that the amount of polyisocyanate added to the prepolymer should range between 5 and 15% by weight based on the prepolymer for enabling the foamed polymer to be high in hardness, low in specific gravity and, thus, suitable for use as a cushioning material. Incidentally, the foamed polymer of Control 10 was so limp as to readily cause bottom-out, failing to provide a satisfactory cushioning material.

What we claim is:

1. A resilient hydrophobic foamed polymer obtained by reacting a mixture of an isocyanate terminated urethane prepolymer and a polyisocyanate (A) with water, said prepolymer being relatively hydrophilic and the reaction product of a molar excess of a polyisocyanate (B) with a polyetherpolyol having from 15 to 50% by weight of oxyethylene content, said water amounting to between about 15 to 150% by weight based on said prepolymer, the amount of said polyisocyanate (A) ranging between about 5 to 15% by weight based on said prepolymer, said polyetherpolyol being selected from the group consisting of (a) the addition polymerization product of a starting material, ethylene oxide and another epoxide and (b) a mixture of at least two of the following:
   (1) The addition polymerization product of a starting material and ethylene oxide;
   (2) the addition polymerization product of a starting material and an epoxide other than ethylene oxide;
   (3) the addition polymerization material, ethylene oxide and another epoxide,
   and said starting material being selected from the group consisting of ethylene glycol, diethylene glycol, propylene glycol; dipropylene glycol; butylene glycol; hexylene glycol; glycerol; trimethylolethane; trimethylol propane; 1,2,6-hexanetriol; pentaerythritol; α-methylglycoside; sorbitol and sucrose.

2. A resilient hydrophobic foamed polymer of claim 1 wherein the oxyethylene content of said polyetherpolyol is about 30 to 45% by weight.

3. A resilient hydrophobic foamed polymer of claim 1 wherein said another epoxide is selected from the group consisting of propylene oxide, butylene oxide and styrene oxide.

4. A resilient hydrophobic foamed polymer of claim 1 said water content ranging between about 20 to 100% by weight based on said prepolymer.

5. A resilient hydrophobic foamed polymer of claim 1 wherein said polyisocyanate (A) and polyisocyanate (B) are the same or different material selected from the group consisting of tolylene diisocyanate, naphthalene diisocyanate, diphenylmethane diisocyanate, xylene diisocyanate and hexamethylene diisocyanate.

6. A resilient hydrophobic foamed polymer of claim 1 wherein said polyetherpolyol is the addition polymerization product of the starting material, ethylene oxide and propylen oxide, and said polyisocyanates (A) and (B) are tolylene diisocyanate.

7. A cushioning material consisting of the resilient hydrophobic foamed polymer of any one of claims 5 and 6.

8. A method of producing a resilient hydrophobic foamed polymer, comprising the steps of reacting a polyetherpolyol containing 15 to 50% by weight of oxyethylene with a molar excess of a polyisocyanate (B) so as to prepare a relatively hydrophilic urethane prepolymer, and reacting a mixture of the prepolymer and about 5 to 15% by weight of a polyisocyanate (A) based on the prepolymer with about 15 to 150% by weight of water based on the prepolymer, said polyetherpolyol being selected from the group consisting of (a) the addition polymerization product of a starting material, ethylene oxide and another epoxide and (b) a mixture of at least two of the following:
   (1) the addition polymerization product of a starting material and ethylene oxide;
   (2) the addition polymerization product of a starting material and an epoxide other than ethylene oxide;
   (3) the addition polymerization material, ethylene oxide and another epoxide,
   and said starting material being selected from the group consisting of ethylene glycol, diethylene glycol, propylene glycol; dipropylene glycol; butylene glycol; hexylene glycol; glycerol; trimethylolethane; trimethylol propane; 1,2,6-hexanetriol; pentaerythritol; α-methylglycoside; sorbitol and sucrose.

9. A method of producing a cushioning material, which follows the process of claim 8.

* * * * *